Patented Sept. 4, 1945

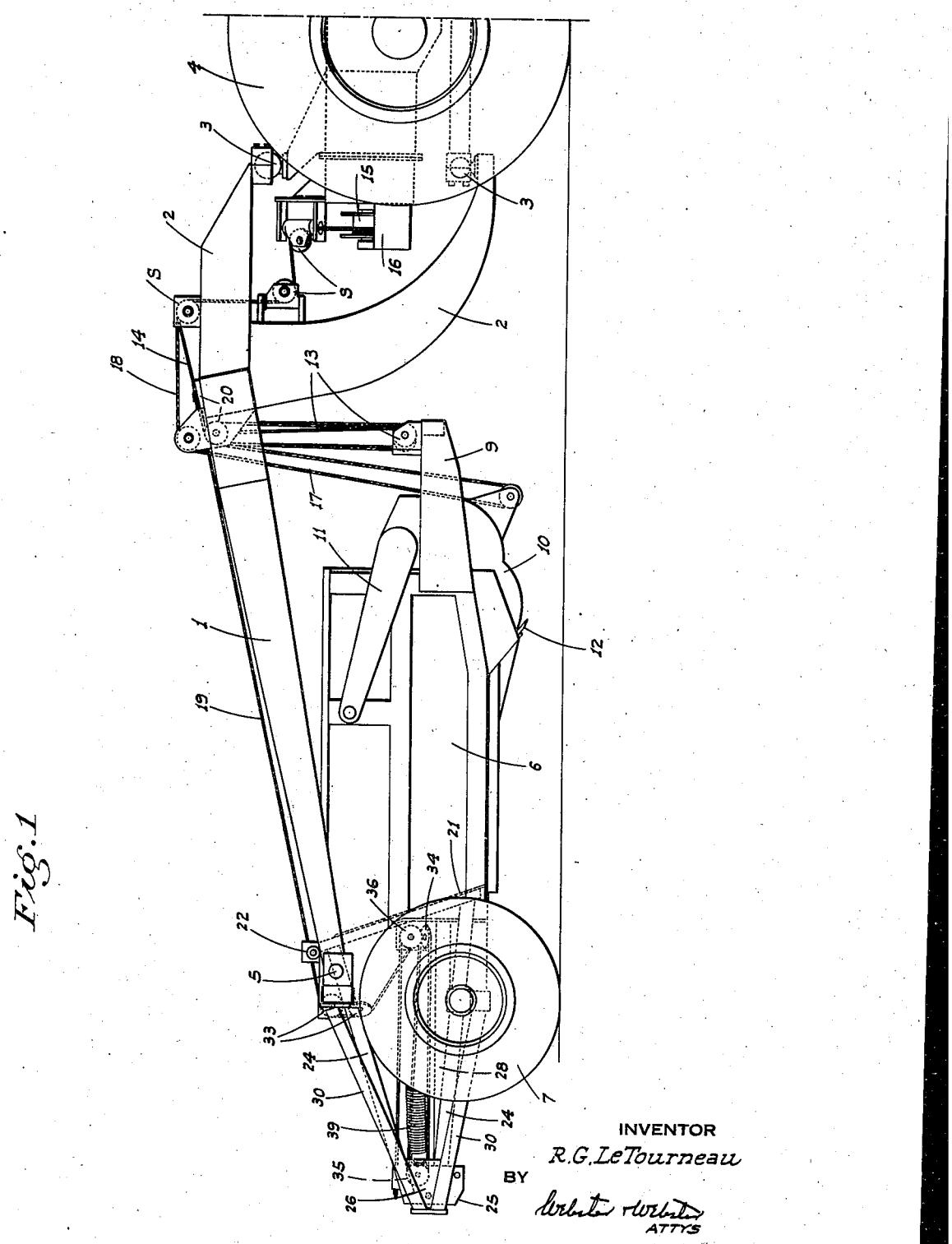

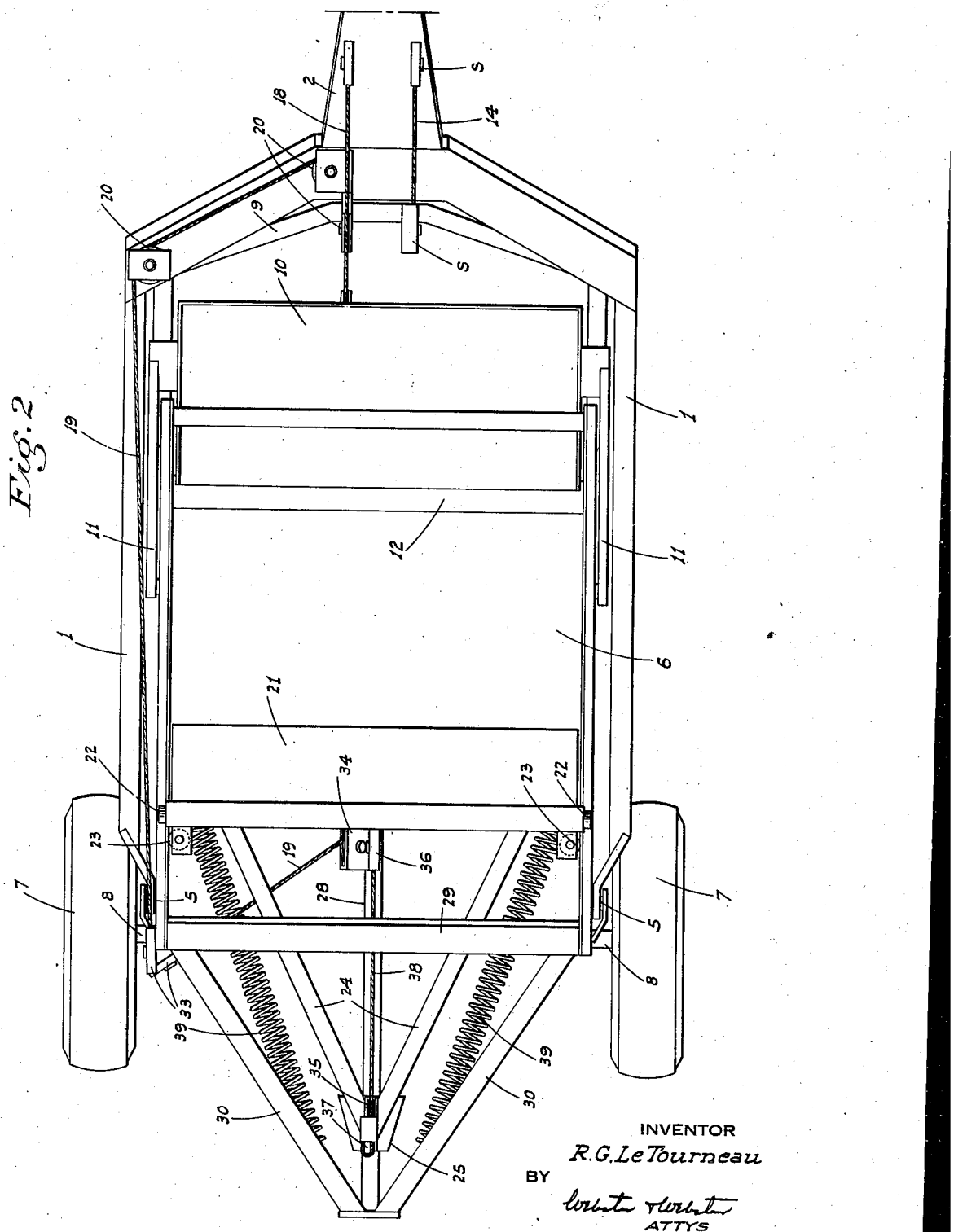

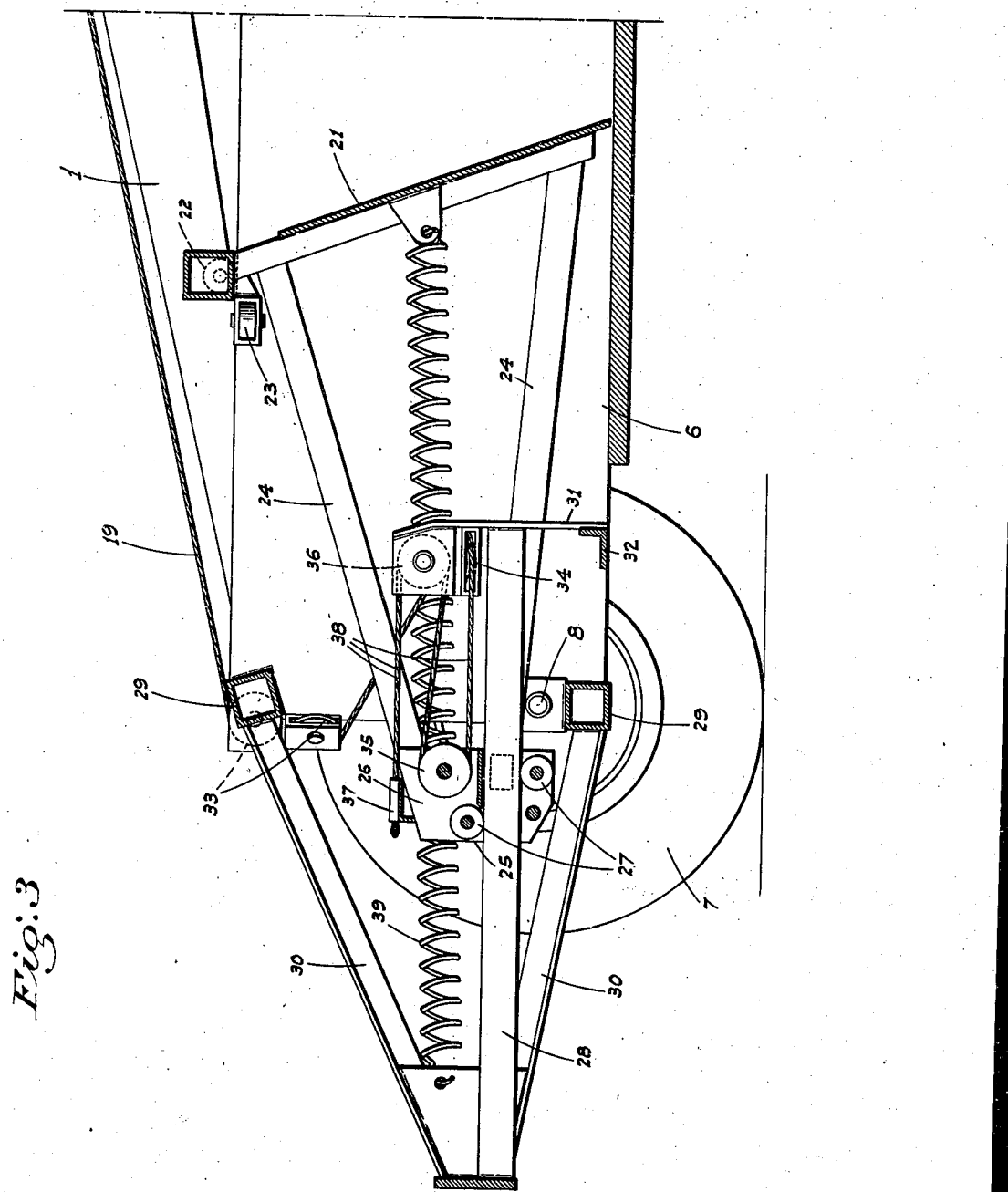

2,383,978

UNITED STATES PATENT OFFICE 2,383,978

SCRAPER TAIL-GATE MOUNT AND CONTROL

Robert G. Le Tourneau, Peoria, Ill., assignor to R. G. Le Tourneau, Inc., Stockton, Calif., a corporation of California Application January 17, 1944, Serial No. 518,529

6 Claims. (Cl. 37—126)

This invention represents improvements in an earth scraper of the carry type which includes, in a main bowl, a longitudinally movable power actuated end gate or tailgate operative to sweep the load from the bowl; it being one object of the invention to provide a tailgate mount and control having improved characteristics.

Another object of the invention is to provide a tailgate mount and control, as above, which is advanced by a cable actuated mechanism and spring retracted; said mechanism including a novel carriage assembly which functions in cooperation with the tailgate pull-back springs to provide non-binding straight line motion of said tailgate.

A further object of the invention is to provide a tailgate mount and control which comprises, with a longitudinally movable tailgate, upper and lower pairs of transversely spaced rearwardly projecting arms fixed on the tailgate at the back, the arms of each pair converging in a horizontal plane and said upper and lower pairs converging in a vertical plane, and a longitudinally movable carriage mounted for guided movement rearwardly of the tailgate and to which carriage the arms are fixed at their rear ends; there being a cable actuated mechanism to advance said carriage and pull-back springs connected with opposite end portions of the tailgate and symmetrically disposed on opposite sides of said carriage.

An additional object of the invention is to provide a tailgate mount and control, as in the preceding paragraph, in which said carriage, cable actuated mechanism, and pull-back springs are arranged within a protective frame.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of a scraper embodying the invention.

Figure 2 is a top plan view thereof.

Figure 3 is an enlarged fragmentary sectional elevation illustrating, in detail, the tailgate mount and control.

Referring now more particularly to the characters of reference on the drawings, the scraper comprises, generally, a main frame 1 which in plan is U shaped, open to the rear, and fitted at its closed forward end with a centrally disposed vertical draft yoke 2 whose legs are coupled at their forward ends, by means shown at 3, in draft relation to a tractor 4. The frame 1 extends rearwardly at a slight downward incline and at its rear ends is pivotally connected, as at 5, to the sides of a rigid bowl 6 adjacent the upper rear corners thereof; said bowl being supported at the rear by transversely spaced wheels 7 journaled on stub axles 8 which project from the bowl adjacent its lower edge.

The forward end of bowl 6 includes a forwardly projecting lifting yoke 9 which extends from side to side of said bowl and about a front apron 10 pivotally mounted for relative up and down movement by side arms 11 which lie alongside and are pivoted to the bowl on the outside. The apron 10 cooperates with the digging or cutting blade 12 on the bottom of the bowl at its forward edge.

The bowl is raised and lowered by a cable system which comprises a centrally disposed block and tackle unit 13 connected between yoke 9 and frame 1, with the pull lead 14 passing forwardly over a direction changing sheave assembly S to one drum 15 of a two-drum power control unit 16 on the rear end of the tractor within the draft yoke 2.

The apron 10 is similarly controlled by a cable system which comprises a block and tackle unit 17 connected centrally between the apron and frame 1. The pull lead 18 of block and tackle unit 17 runs to the other drum of the power control unit 16, but in this cable system the block and tackle unit includes an opposed or other end lead 19 which is carried by direction changing sheaves 20 to and rearwardly along one side of frame 1 for actuating connection with the tailgate control mechanism, as will hereinafter appear. The cable system for the apron 10 thus also serves to operate the tailgate control mechanism.

The bowl is closed at its rear end by a normally retracted tailgate 21 which includes top rollers 22 which ride the upper edges of the sides of the bowl, and side rollers 23 which engage the sides of the bowl, whereby the tailgate is supported for movement in said bowl.

Upper and lower pairs of transversely spaced rigid arms 24 are secured on the tailgate 21 at the back and project rearwardly therefrom in converging relation both in a vertical and a horizontal plane; said arms being fixedly attached at their rear ends to a carriage 25. The carriage 25 includes spaced side plates 26 between which are vertically spaced rollers 27 which ride top and bottom on a longitudinally extending guide beam 28. The guide beam 28 is mounted centrally of the sides of the scraper and is carried in a skeleton frame on and projecting rearwardly from the bowl. This skeleton frame includes upper and lower cross beams 29, and rearwardly projecting and converging frame members 30 corresponding to arms 24 and generally symmetrically disposed, said frame members being secured together at their rear ends and supporting the adjacent end of the guide beam 28. A vertical post or plate 31 upstands from a cross member 32 and supports the forward end of said guide beam.

The guide beam 28 rides between rollers 27 of carriage 25, and as the tailgate is roller supported at 22 and 23, the tailgate, together with the arms 24 and carriage 25, move readily as a unit and along a fixed path parallel to the bottom of the bowl 6.

Advancing movement of the above tailgate unit is accomplished by a forward pull on cable lead 19 and through the medium of the following arrangement:

At the back end of the bowl, cable lead 19, which initially extends along one side of the scraper, passes over the direction-changing sheaves 33 and runs laterally inward and downward therefrom to and is reeved about a centrally disposed direction-changing sheave 34 secured on post 31 above guide beam 28. From sheave 34 the cable leads to and passes about a sheave 35 secured between plates 26 of carriage 25, and then extends forwardly over another sheave 36 mounted on post 31 above sheave 34. From sheave 36 the cable leads to and is dead ended at 37 on the carriage; the sheaves 34, 35 and 36, with the cable extending therebetween, forming a block and tackle system 38.

A pull on cable lead 19 shortens the block and tackle system 38, causing forward movement of the tailgate unit from retracted position, as in Figs. 1 and 2, to an advanced position, as in Fig. 3.

Return movement of the tailgate unit to its normal or starting position, along with resultant lengthening of block and tackle system 38, is accomplished by a pair of longitudinally extending heavy-duty tension springs 39 connected at their forward ends in transversely spaced relation to the back of the tailgate 21 and extending rearwardly in generally converging relation to connection at their rear ends with the assembly of frame members 30 adjacent the rear ends thereof. The springs 39 are symmetrically disposed, in plan, relative to the guide beam 28 and the arms 24, and thus when loaded by advance of the tailgate unit, exert a balanced force on opposite sides of guide beam 28 whereby to produce a free return movement of said unit to starting position from an advanced position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention, what I claim as new and useful and desire to secure by Letters Patent is:

1. An actuating mount for a scraper bowl tailgate, comprising a carriage disposed rearwardly of the tailgate, means mounting said carriage for guided longitudinal movement, means connecting the tailgate and carriage for movement as a unit, and means to positively advance and retract said carriage and tailgate unit; said connecting means comprising upper and lower pairs of transversely spaced arms fixed in connection with the tailgate at points substantially adjacent the four outer corners thereof, and projecting rearwardly in converging relation both in a horizontal and vertical plane.

2. An actuating mount for a scraper bowl tailgate, comprising a carriage disposed rearwardly of the tailgate, means mounting said carriage for guided longitudinal movement, means connecting the tailgate and carriage for movement as a unit, and means to positively advance and retract said carriage and tailgate unit; said connecting means comprising upper and lower pairs of transversely spaced arms fixed in connection with the tailgate at points substantially adjacent the four outer corners thereof, and projecting rearwardly in converging relation both in a horizontal and vertical plane, and said last named means comprising longitudinally extending pull-back springs connected to the tailgate on opposite sides of said carriage and arms in generally symmetrical relation thereto in plan.

3. An actuating mount for a scraper bowl tailgate comprising an open supporting frame mounted on and projecting rearwardly from the bowl, a longitudinal guide beam mounted in said frame rearwardly of the tailgate, a carriage mounted on said beam for guided movement therealong, upper and lower pairs of transversely spaced arms attached at one end to the tailgate adjacent the four outer corners thereof, and at the other end to the carriage, said arms converging rearwardly both in a vertical and horizontal plane, a block and longitudinally disposed tackle system connected between said carriage and an anchor in the frame ahead of the carriage, and longitudinally disposed pull-back springs connected between the tailgate and frame on opposite sides of said carriage.

4. An actuating mount for a scraper bowl tailgate comprising the combination with a scraper bowl and a tailgate therein, which tailgate is adapted to be moved forwardly through the bowl to eject a load therefrom, of a rigid supporting frame projecting rearwardly of the scraper bowl, a rigid beam disposed substantially central of the frame and supported by the frame, a carriage guided on the beam and adapted to have fore and aft sliding movement thereon and normally resting adjacent the rear end of said beam, arms fixed to said carriage and diverging outwardly and forwardly from said carriage and being secured to the tailgate at points substantially adjacent the outer four corners thereof, and means to move the carriage along the beam either forwardly or backwardly to respectively advance or retract the tailgate through the bowl.

5. A structure as in claim 4, in which the last named means comprises a block and tackle unit to pull the carriage forwardly and a tension spring means interposed between the outer end of the rigid frame and the tailgate and acting to retract the latter from its forward to its rear position in the bowl.

6. An actuating mount for a scraper bowl tailgate, comprising the combination with a scraper bowl and a tailgate therein and which tailgate is adapted to be moved forwardly through the bowl to eject a load therefrom, of a rigid supporting frame projecting rearwardly of the bowl, an upstanding post supported on the frame immediately at the rear of the bowl and substantially midway between the sides thereof, a rigid beam disposed substantially centrally of the frame, being supported by the frame, and extending between the rear end thereof and said post, a carriage guided on the beam and adapted to have fore and aft sliding movement thereon, rigid pushing means fixed to the carriage and diverging outward therefrom and fixed to the tailgate at points substantially adjacent the four outer corners thereof, a pulley on the carriage, a pulley on the post in substantial alignment with the first pulley, a cable dead ended on the carriage and extending thence around the post pulley and then around the carriage pulley, and power means adapted to be applied to the free end of the cable to exert a pull thereon to shorten the runs between the pulleys and hence advance the carriage along the beam and hence push the tailgate forwardly through the scraper bowl, and means to retract the tailgate to its rearmost position in the bowl upon release of the pull on the cable.

ROBERT G. LE TOURNEAU.